(12) United States Patent
Doig

(10) Patent No.: US 7,832,431 B2
(45) Date of Patent: Nov. 16, 2010

(54) VALVES AND PUMPS

(76) Inventor: Ian D. Doig, 94 Stingaree Point Drive, Dora Creek (AU) NSW 2264

( * ) Notice: Subject to any disclaimer, the term of this patent is extended or adjusted under 35 U.S.C. 154(b) by 431 days.

(21) Appl. No.: 11/911,115

(22) PCT Filed: Apr. 11, 2006

(86) PCT No.: PCT/AU2006/000482

§ 371 (c)(1), (2), (4) Date: Oct. 10, 2007

(87) PCT Pub. No.: WO2006/108219

PCT Pub. Date: Oct. 19, 2006

(65) Prior Publication Data

US 2008/0203001 A1 Aug. 28, 2008

(30) Foreign Application Priority Data

Apr. 12, 2005 (AU) .............................. 2005901805
May 23, 2005 (AU) .............................. 2005902616

(51) Int. Cl.
*F16K 15/14* (2006.01)
(52) U.S. Cl. ......................................... 137/853; 251/57
(58) Field of Classification Search .................. 137/846, 137/847, 850, 843, 494, 853, 877, 860; 251/5, 251/175, 57
See application file for complete search history.

(56) References Cited

U.S. PATENT DOCUMENTS

| | | | |
|---|---|---|---|
| 3,387,624 A * | 6/1968 | Soucy | 137/847 |
| 3,479,001 A * | 11/1969 | Dower | 251/4 |
| 3,494,588 A * | 2/1970 | Kisling | 251/5 |
| 3,951,572 A | 4/1976 | Ray, Jr. et al. | |
| 3,984,080 A | 10/1976 | Varis et al. | |
| 4,111,391 A | 9/1978 | Pillola | |
| 4,135,550 A | 1/1979 | Andersson | |
| 4,344,743 A | 8/1982 | Bessman | |

(Continued)

FOREIGN PATENT DOCUMENTS

FR 2250932 6/1975

(Continued)

*Primary Examiner*—John Fox
(74) *Attorney, Agent, or Firm*—Coats and Bennett

(57) ABSTRACT

A check valve (10) comprises, a flexible tube (11) having first and second end portions defining an inlet (13) and an outlet (14), respectively, and a rigid valve body (12) surrounding the flexible tube (11). The end portions of the flexible tube are sealingly fixed to the valve body (12) to define an enclosed space (17) between the exterior of the flexible tube and the interior of the valve body. A fixed volume of a substantially incompressible fluid is located in the enclosed space (17). When the pressure at the outlet (14) is greater than the pressure at the inlet (13), the flexible tube is substantially collapsed so as to close the valve or allow severely restricted flow. However when the pressure at the inlet is greater than that at the outlet, some of the fluid is displaced from the inlet area towards the outlet area so that the flexible tube (11) is expanded in the area adjacent the inlet and the tube is substantially open. A pump based on a series of valves having some of the attributes of the check valve is also disclosed, as is a vacuum driven sewer system that incorporates a pinch valve.

18 Claims, 14 Drawing Sheets

U.S. PATENT DOCUMENTS

| | | | |
|---|---|---|---|
| 4,382,582 A | | 5/1983 | Seki |
| 4,492,253 A | | 1/1985 | Raftis |
| 4,607,663 A | | 8/1986 | Raftis et al. |
| 4,630,635 A | | 12/1986 | Bernstein et al. |
| 5,205,325 A | * | 4/1993 | Piper ............................ 137/844 |
| 5,535,983 A | * | 7/1996 | Hohermuth .................... 251/5 |
| 5,570,715 A | | 11/1996 | Featheringill et al. |
| 5,931,197 A | | 8/1999 | Raftis et al. |
| 5,931,648 A | | 8/1999 | Del Canizo |
| 6,575,425 B1 | | 6/2003 | Betz |
| 6,585,005 B1 | | 7/2003 | Raftis et al. |
| 6,953,059 B2 | | 10/2005 | Raftis |

FOREIGN PATENT DOCUMENTS

| | | |
|---|---|---|
| JP | 61053470 | 3/1986 |

* cited by examiner

VALVES AND PUMPS

This application claims priority from Australian Provisional Patent Application No. 2005901805 entitled "A slurry valve and applications" filed 12 Apr. 2005 and from Australian Provisional Patent Application No. 2005902616 entitled "FT valves and applications" filed 23 May 2005, the entire contents of which are incorporated herein by reference.

FIELD OF THE INVENTION

This invention relates to improvements in valves and pumps. In particular, it relates to improvements in pinch valves and to an improved pump incorporating features of such an improved valve.

BACKGROUND OF THE INVENTION

A pinch valve typically consists of a flexible resilient cylindrical elastomeric sleeve disposed in a valve body in the form of a continuous tube, sleeve or the like, together with a means to constrict the sleeve so as to control or stop the flow of fluid through the pipe. Typically the sleeve is concentrically located within a rigid outer valve housing and suitable means are provided to impress a fluid under pressure between the sleeve and the rigid valve housing so that the sleeve is squeezed inwards and deformed or collapsed to provide a restricted fluid flow passage. The impressed fluid is typically a gas or liquid under pressure. When that pressure is released, the resilience of the elastomeric tube is relied upon to open the valve. The elastomeric sleeve typically comprises a fabric reinforcement embedded in synthetic rubber to support the valve closure against the introduced pressure.

Higher valve delivery pressure capacity and the need for adequate resilience in the tube to induce suction at the valve inlet when opening, require increasing layers of fabric reinforcement and increased wall thickness for the tube. This leads to a consequent loss of flexibility to the point where the required wall thickness may become impractical for use as a pinch valve.

A duck-beak valve is a check valve form of the pinch valve that is closed in its relaxed condition with the outlet end of the sleeve unattached to the valve body. The fluid transiting the valve surrounds the inside and the outside of the sleeve, which opens when the valve inlet pressure sufficiently exceeds the valve outlet pressure.

The alternative use of flap type check valves have the problem that they are vulnerable to being held open by the entrapment of solids between the flap and the valve seat.

Thus, one object of the present invention to provide an improved valve in which less reliance is placed on the resilience of the elastomeric tube for opening the valve while at the same time retaining the tolerance of the pinch valve design towards entrapment of transiting particles without leaking.

Subsidiary preferred objects relate to increasing the delivery pressure capacity of the pinch valve, with less sacrifice of the tube's flexibility.

Other preferred aspects of the invention relate to the adaptation of the pinch valve as a check valve and as a component of a pump.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

A first broad aspect of the present invention provides a valve comprising:

a flexible tube having first and second end portions defining an inlet and an outlet, respectively;

a rigid valve body surrounding the flexible tube, the end portions of the flexible tube being sealingly fixed to the valve body to define an enclosed space between the exterior of the flexible tube and the interior of the valve body; and a fixed volume of a substantially incompressible fluid located in the said enclosed space; and wherein the arrangement being such that when the pressure at the outlet is greater than the pressure at the inlet, the flexible tube is substantially collapsed so as to close the valve or allow severely restricted flow, and wherein when the pressure at the inlet is greater than that at the outlet, some of the fluid is displaced from the inlet area towards the outlet area so that the flexible tube is expanded in the area adjacent the inlet and the tube is substantially open.

In a preferred embodiment the girth of the outlet of the flexible tube is greater than the girth of the inlet of the flexible tube.

The valve body may be substantially cylindrical and the diameter of the valve body at the outlet may be greater than the diameter of the valve body at the inlet.

When the pressure at the valve outlet is larger than the pressure at the valve inlet the walls of the flexible tube at the outlet are pushed outwards displacing liquid towards the inlet and pinching or squeezing the walls of the tube together at the inlet region to close the valve. However, when the valve inlet pressure is larger than that of the outlet the walls of the flexible tube expand outwards at the inlet area displacing liquid towards the outlet. Since the girth of the tube in its outlet region is larger than the girth in the inlet region and because there is a fixed volume of incompressible fluid between the valve body and the flexible tube, the valve opens.

In one embodiment, the walls of the tube in a region adjacent the inlet are preferably more flexible than its walls in a region adjacent its outlet, and the length of the flexible tube is longer in its outlet region than in its inlet region.

The tube may comprise two or more part tubes fixed together by clamping, or other suitable means to define a tube.

Preferably, reinforcing spokes are defined in the flexible tube adjacent the inlet and/or outlet of the valve.

The spokes may comprise round section steel bars with ball joint elements at the inlet and/or outlet ends.

In a preferred embodiment, a retaining ring is defined at the inlet and/or outlet and holds the ball joint elements in sockets so as to restrict the ring end of the reinforcing spokes to a circular shape.

In a second aspect, the present invention provides a pump comprising a series of valves, said valves comprising a flexible tube having first and second end portions defining an inlet and an outlet, respectively, said flexible tube having a length that is at least one third longer in its axial length than its girth;

a valve body surrounding the flexible tube, the end portions of the flexible tube being sealingly fixed to the valve body to define an enclosed space between the exterior of the flexible tube and the interior of the valve body; and a fixed volume of a substantially incompressible fluid located in the said enclosed space; and actuator means for applying increased pressure to the volume of the fluid thereby compressing the flexible tube and means for activating said actuator means;

and wherein a plurality of such valves linked in series end to end without obstructions therebetween;

and control means are provided to operate the actuator means of each valve in sequence such that the valves may be opened and closed in a controlled sequence with an upstream end of the series opening or closing first to define a closed portion due to compression of the flexible tube with the closed portion progressing downstream.

Typically there will be at least three valves in series. The actuator of the valves may include a flexible diaphragm.

In a third aspect, the invention provides, a system for the periodic withdrawal of sewage or waste water into a sewer system, operating at sub-atmospheric pressure, from a well in which waste water accumulates using a flexible tube type pinch valve wherein;

an exit pipe depends into the well for the egress of said liquids or liquid/solid mixtures from the pit, flow through the exit pipe being controlled by the flexible tube type pinch valve, the exit pipe having an inlet located inside the well and the enclosed space between the exterior of the flexible tube and the interior of the valve body of the pinch valve is connected to both a first conduit depending into the waste water in the well and a second conduit connected to the sub-atmospheric pressure of the sewer system downstream of the pinch valve;

wherein the second conduit includes a flow restriction means, whereby air at atmospheric pressure is prevented from entering the enclosed space of the pinch valve when the open end of the first conduit is submerged in the waste water, thereby exposing the enclosed space to sub-atmospheric pressure which holds the pinch valve open, and when the waste water level in the well falls and exposes the open end of the first conduit atmospheric pressure air enters the enclosed space and is throttled by the flow restriction means, which causes the pressure in the enclosed space to rise to atmospheric, closing the pinch valve.

In an alternative to the third aspect, the base of the first conduit is not submerged, but is closed by a valve from which a float depends, whereby when the waste water level in the well falls below the level at which the buoyancy of the float combined with the sub-atmospheric pressure force holding the valve closed is sufficient, the float falls, opening the valve, air enters the first conduit and the pinch valve opens, and when the waste water level in the well rises it lifts and closes the valve and the pinch valve closes;

thereby opening the pinch valve when the waste water level attains its high level, and remaining open until the waste water level re-attains its low level.

BRIEF DESCRIPTION OF THE DRAWINGS

Preferred embodiments of the invention will now be described by way of example only with reference to the accompanying drawings in which.

DETAILED DESCRIPTION OF PREFERRED EMBODIMENTS

Figure 1:
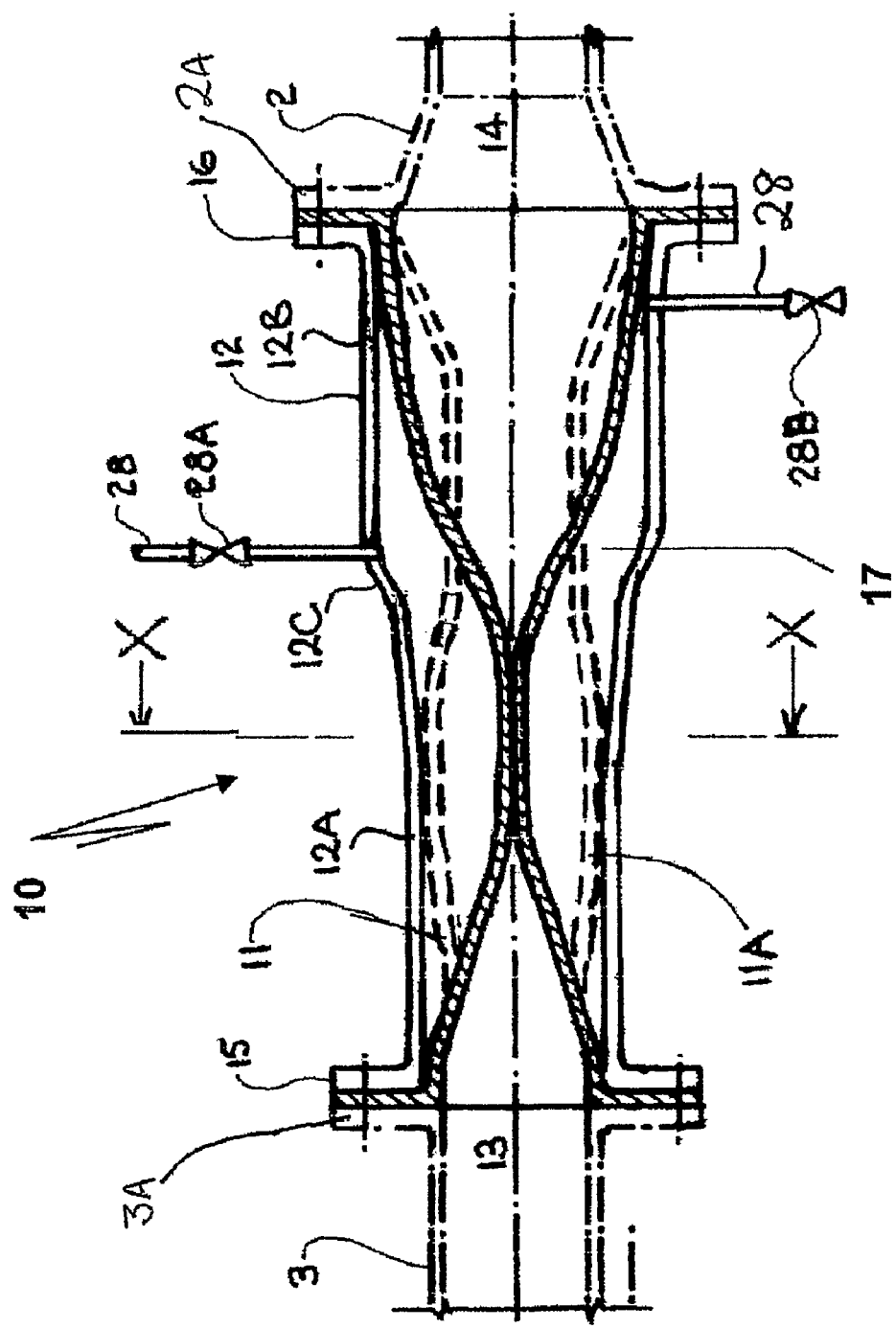
FIG. 1 is a schematic side view of a valve, partly shown in cross section.

Referring to the drawings, FIG. 1 shows a side view in cross section of a check valve 10 sealingly bolted between an outlet pipe 2 and an inlet pipe 3. The valve 10 comprises a hollow generally cylindrical housing in the form of a valve body 12 defining flanged ends 15 and 16. A flexible tube 11 is shown in the closed position with flanged ends sealingly clamped between the faces of the flanges 15 and 16 at the inlet and outlet ends of the valve body respectively and the flanges 2A of the outlet pipe 2 and 3A of the inlet pipe 3, as shown.

The flexible tube 11 typically comprises a fabric reinforcement embedded in rubber although other materials could be used to provide the required degree of flexibility and fatigue resistance.

As can be seen, an enclosed space 17 is formed between the outer walls of the tube 11 and the interior of the valve body 12.

Tubes 28, controlled by valves 28A and 28B, are provided to allow fluid to enter, or be withdrawn from, the enclosed space 17 during servicing of the valve. However, it is to be noted that these valves 28a and 28b can be and are fully closed in use, to prevent ingress or egress of the fluid from the enclosed space 17. The opening and closing of the valve 10 is not dependent on the entry or egress of fluid along the tubes 28.

It is to be noted that the outlet diameter 12B or girth of the valve body 12 is greater than the inlet diameter or girth 12A, with the diameter increasing at an angled step portion 12C.

In use, the enclosed space 17 is filled with a substantially incompressible non-volatile gas free liquid through pipes 28 and sealed. FIG. 1 shows the valve in the closed position in which the flexible tube 11 is pinched closed and fluid is prevented from passing from the inlet 13 to the outlet 14. Specifically, the tube is pinched and closed adjacent its inlet region 13 and expanded adjacent its outlet region 14 where the diameter of the valve body is greater and the flexible tube is expanded.

When the pressure at the outlet 14 is larger than the pressure at the inlet 13, the walls of the flexible tube adjacent the outlet 14 expand/are pushed outwards displacing the liquid in the enclosed spaced 17 towards the inlet and pinching or squeezing the walls of the flexible tube together adjacent the inlet. This state is shown in FIG. 1.

However, when the pressure at the inlet 13 is larger than that at the outlet, the walls of the flexible tube in the inlet region 13 are forced outwards towards the valve body, and this displaces or pushes the liquid in the enclosed space towards the outlet 14. However, the walls of the flexible tube are unable to close adjacent the outlet area 14 because the girth of the valve body and flexible tube is greater than that in the inlet region. Because the amount of liquid in the enclosed space remains unchanged the valve is opened, as shown in the ghost outline 11A of the flexible tube.

Thus a valve is provided which opens and closes automatically according to the differential pressure at the inlet and outlet of the valve. There are no moving parts. The valve does not require actuation and opens and closes solely based on the pressure differential.

A first alternative to the enlargement of the girth 12B of the flexible tube at the outlet is to have the length of the flexible tube in its outlet regions sufficiently longer than in its inlet regions so that the liquid displaced when the valve is opening does not close the outlet regions of the flexible tube, and for the walls in its inlet region (where the pinch occurs) to be to more flexible than elsewhere.

A second alternative to the enlargement of the flexible tube girth is to construct the flexible tube so that in its relaxed state the flexible tube shape is the pinched shape of the fully closed flexible tube shown in FIG. 1.

Figure 2:
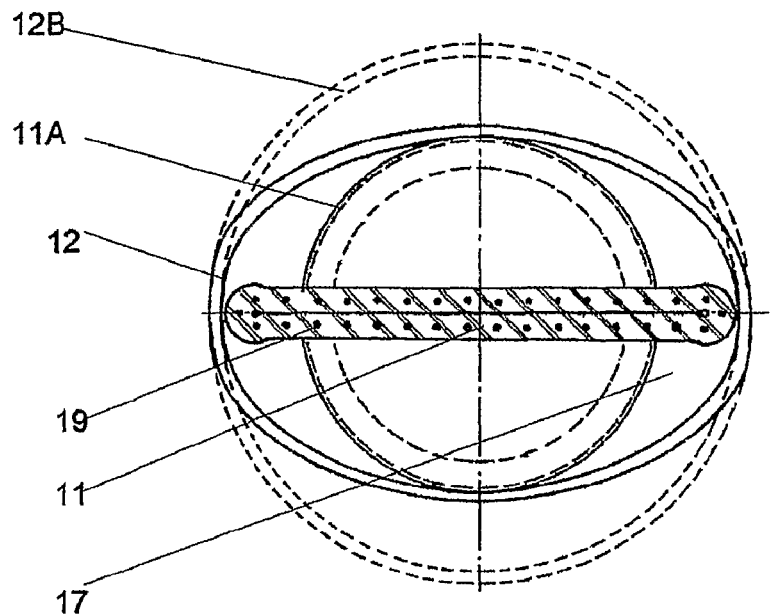
FIG. 2 is an end view in cross section of the valve of FIG. 1 in the directions of the arrows X-X.
Figure 3:
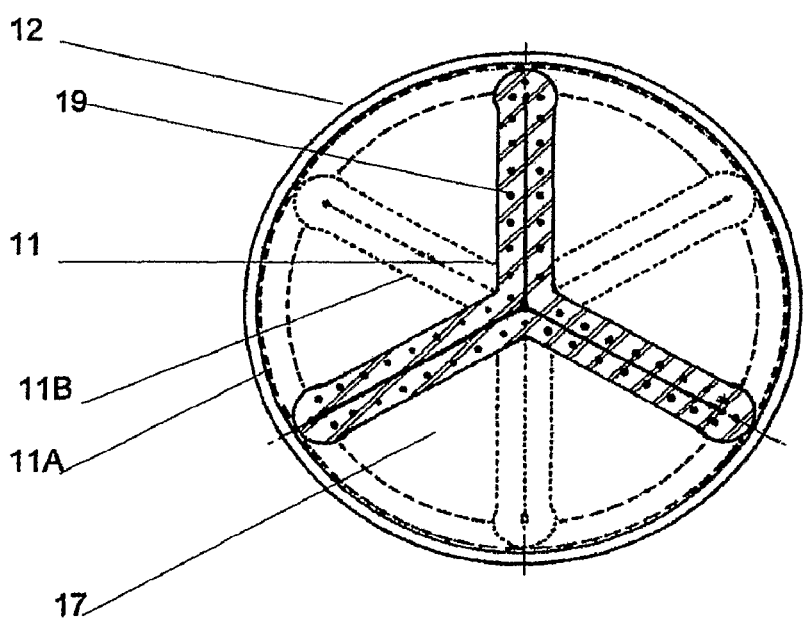
FIG. 3 is an alternative end view in cross section of the valve of FIG. 1 in the direction of the arrows X-X.

FIGS. 2 and 3 show two different end views in cross section of the check valve 10 of FIG. 1 in the direction of arrows X-X. Like numerals indicate features in common with FIG. 1.

FIG. 2 shows the flexible tube closed and flattened between two lobes. To accommodate this shape the body 12 is elliptical in the region of the flexible tube closure, which limits the range of locations for the lobes. To accommodate a range of lobe locations around the full circle the body shape in the region of the flexible tube closure has to be round as shown by the broken lines 12B.

FIG. 3 shows the flexible tube closed and flattened between three lobes to form a star shape. To accommodate this shape the body 12 needs be only slightly larger in diameter in the region of the flexible tube closure than the body diameter at the inlet 13 and outlet 14. The lobes can be located anywhere around the circle, and the broken outline 11B shows one alternative position.

Figure 4:
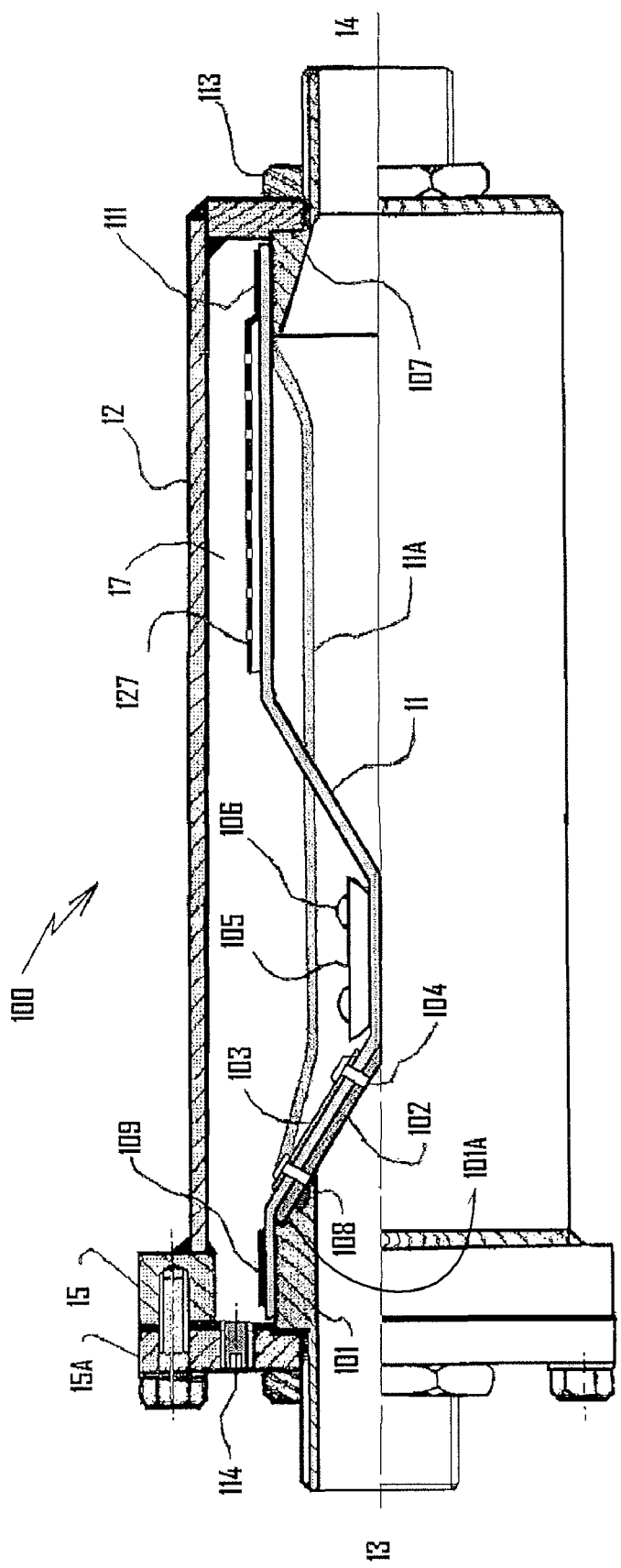
FIG. 4 shows a side view in half cross section of an alternative embodiment of a check valve.
Figure 5:
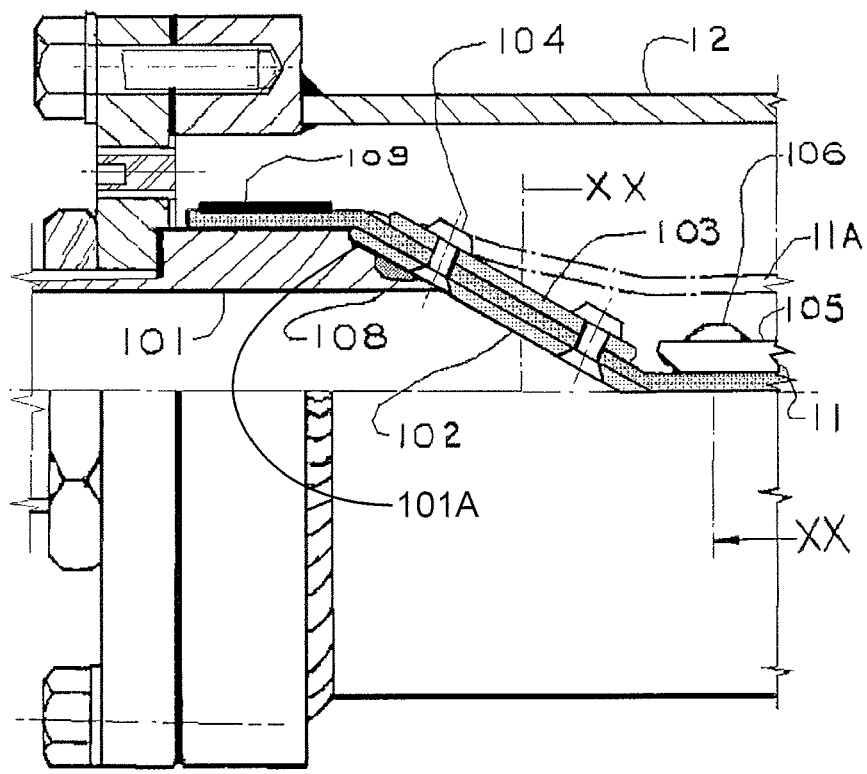
FIG. 5 is an enlargement of the inlet section of FIG. 4.
Figure 6:
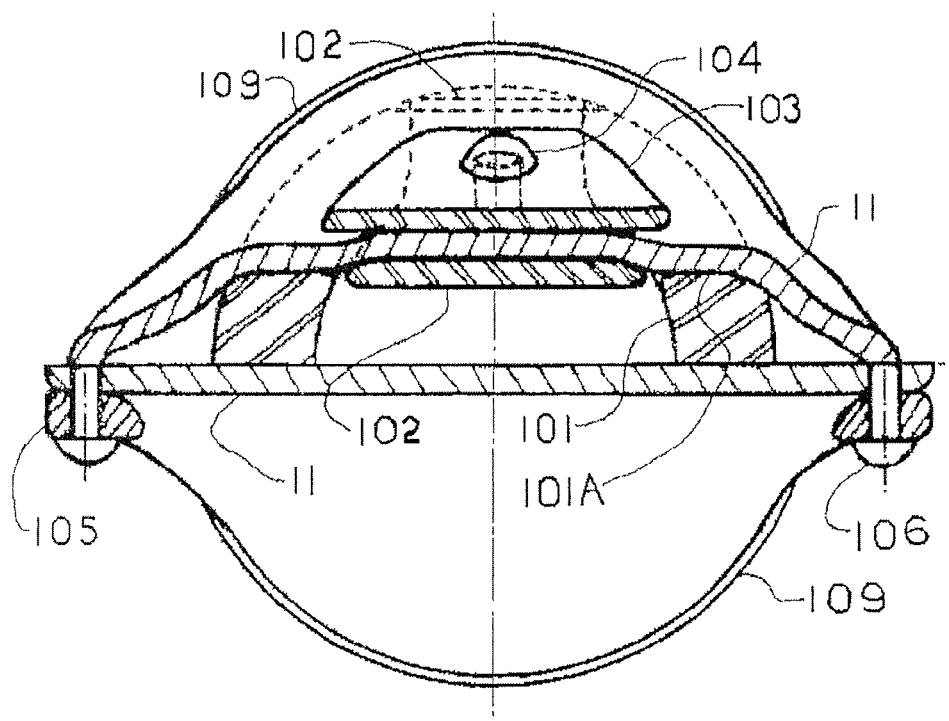
FIG. 6 is an end view in cross section looking in the direction of the arrows XX-XX of FIG. 5.

FIGS. 4 to 6 show an alternative check valve 100 in which like numerals indicate features in common with FIG. 1. In FIGS. 4 to 6 the flexible tube 11 is a straight tube with parallel walls of larger bore than that of the inlet and outlet spigots 101 and 107. The flexible tube 11 is typically formed from synthetic rubber and reinforced with a strong, but flexible, embedded woven fabric. The flexible tube 11 is sealingly clamped at its inlet and outlet ends around the spigots 101 and 107 by clamping straps 109 and 111.

The flexible tube 11 is narrowed over the squeezed section by pairs of stiff clamping bars 105 that permanently clamp each side of the flexible tube by the fasteners 106. They do not clamp the centre of the tube. This clamping of the sides biases the flexible tube flat with its inner walls pressed together over the clamped length as shown in FIG. 6, until the valve inlet pressure exceeds the valve outlet pressure sufficiently to open the valve. This arrangement also minimises deformations of the tube as it flexes, and may thus extend the service life of the tube.

The flexible tube is a "lay flat" tube that may be rolled up, but expands to a circular shape/cross-section when filled with liquid and comprises nitrile rubber reinforced with fine Dacron fibres, although as discussed below, other materials may be used for the flexible tube.

Alternatively, stitching may be substituted for the clamping bars 105. Note that the valve-open flow area through the clamped parts is reduced by the clamping bars 105.

The outlet end spigot 107 has a conical inlet, but the inlet end spigot 101 is cut as shown to provide flat surfaces 101A that support the flexible tube against externally applied pressure when the valve is closed. Additional support is provided by the stiff members 102, which are attached to the inner wall of the flexible tube by the rivets 104 and outer stiff plate 103. Stiff members 102 pivot about a groove at the inlet end of each flat surface 101A. Entry of debris between the stiff member 102 and the spigot 101 as the valve opens is prevented by the expansion of sponge rubber insert 108.

Excursions towards flattening of the flexible tube 11 in its outlet regions is limited by the stiff tube 127, which is perforated.

Flange 15, bolted cover plate 15A and the securing nuts 113 allow the flexible tube to be sealingly encased within valve body 12, and allow for easy dismantling for flexible tube replacements. A sealed screwed plug 114 allows access to the enclosed space 17 for adjusting the liquid inventory.

FIGS. 5 and 6 also provide an example of an alternative duck-beak type of pinch valve wherein like numbered items obtain the same description as FIG. 4.

Figure 7:
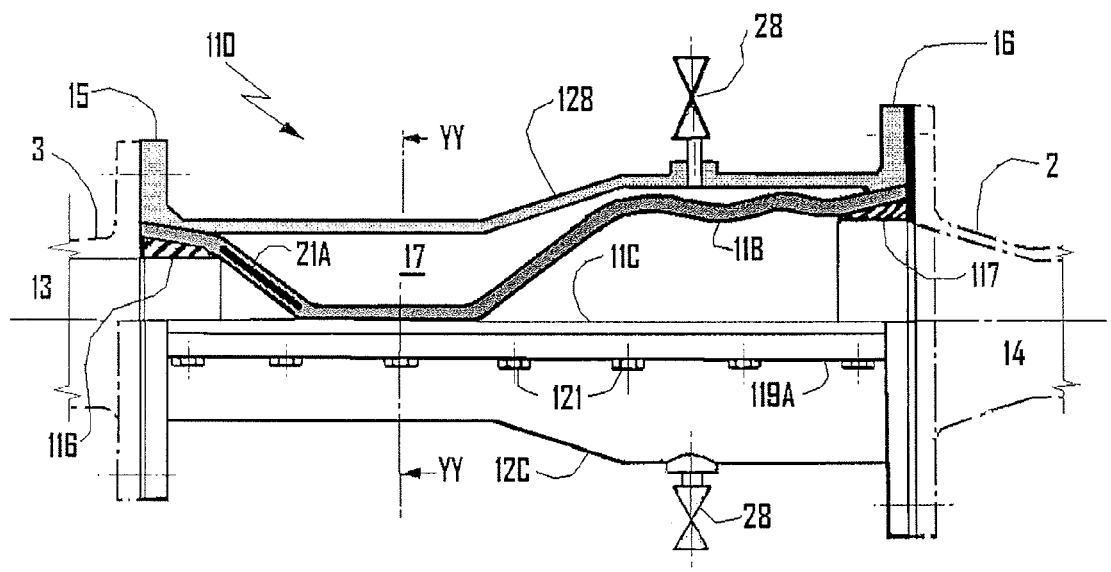
FIG. 7 shows a side view in half cross section of a further embodiment of a check valve.
Figure 8:
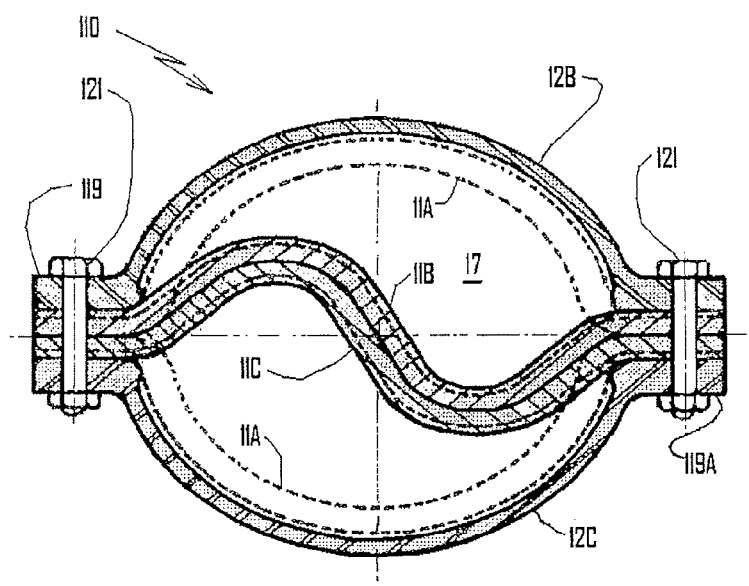
FIG. 8 is an end view in cross section looking in the direction of the arrows YY-YY of FIG. 7.

FIGS. 7 and 8 show two half-flexible tube diaphragms 11B and 11C partly inflated with liquid so that when the check valve is closed (as shown) the two half-flexible tube diaphragms 11B and 11C are locally squeezed sealingly together downstream of the inlet 13 parts of the valve (to close the valve), and inflated upstream of the outlet 14 parts of the valve. The two half-flexible tube diaphragms 11B and 11C are sealingly clamped at each side of the flexible tube check valve between the flanges 119 and 119A of the chamber inner walls 12B and 12C by the bolts 121.

When the flexible tube check valve 110 is open, the position of the upper half-flexible tube diaphragm is shown by the dotted lines 11A (refer to FIG. 8). The inlet and outlet ends of each half-flexible tube diaphragm 11B or 11C are sealingly clamped between the stiff conical insert 117 and the conical chamber inner walls 12B and 12C at the outlet 14, and between the stiff conical insert 116 and the conical chamber inner walls 12B and 12C at the inlet 13. Valves 28 (normally sealed) allow liquid to enter or be withdrawn from the sealed spaces 17. These valves 28 can also allow the admission or extraction of fluid when the valve 110 is being used other than as a check valve.

In FIG. 8 the two half-flexible tube diaphragms 11B and 11C form an S shape in the closed position. Their shape in the open position is shown by the dotted lines 11A. Like numerals indicate features in common with FIG. 1.

As described for the check valve shown in FIGS. 4 to 6, the flexible tube immediately downstream of the inlet 13 must support the pressure at the outlet 14, which is transmitted by the liquid in enclosed space 17. In FIG. 7 reinforcement is provided by a series of closely-spaced rods 21A, embedded in the flexible tube 11B and 11C. Rods 21A pivot within the flexible tube at their inlet end, where they are supported by the conical insert 116.

Figure 9:
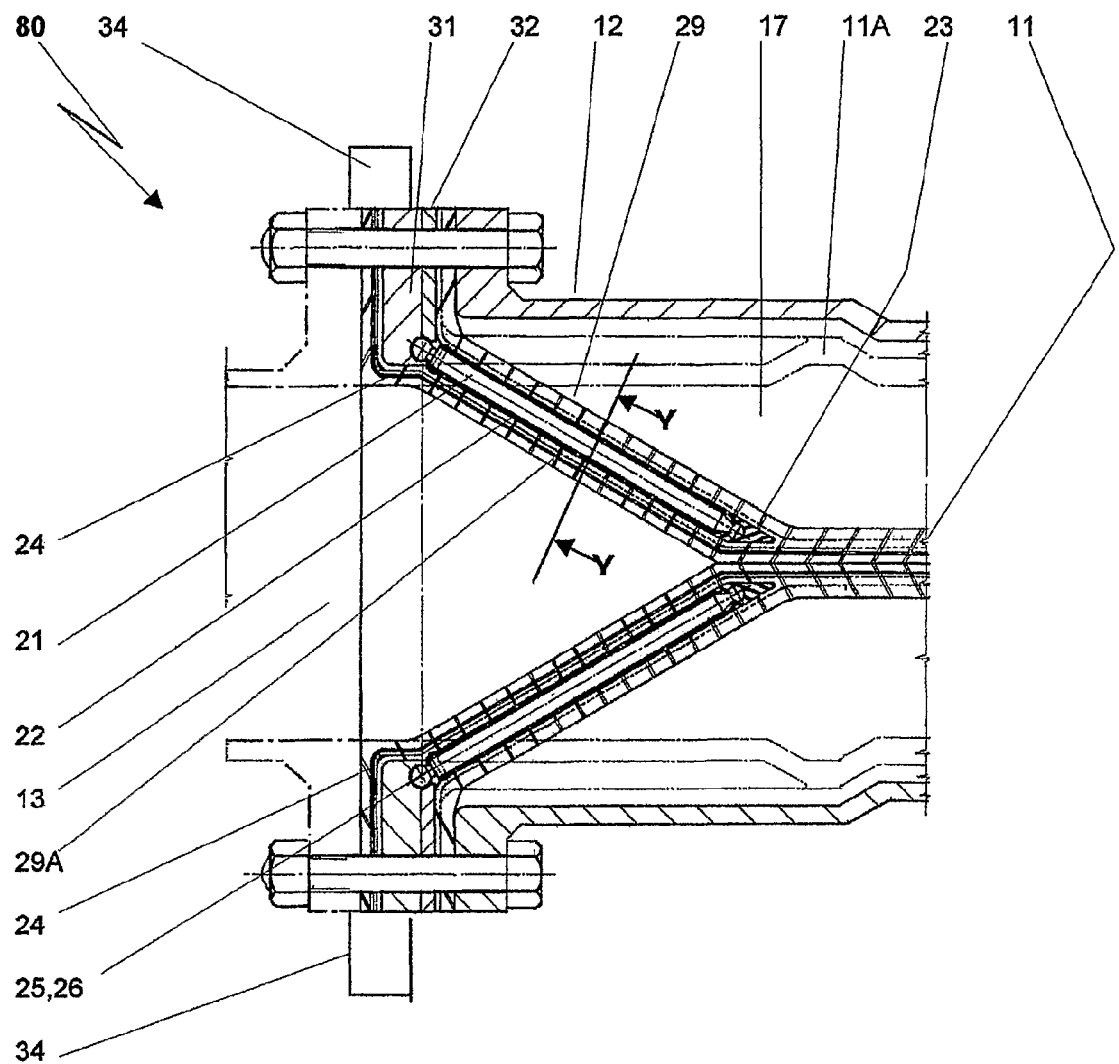
FIG. 9 is a side view in cross section of a reinforcement system for the inlet section of a valve.
Figure 10:
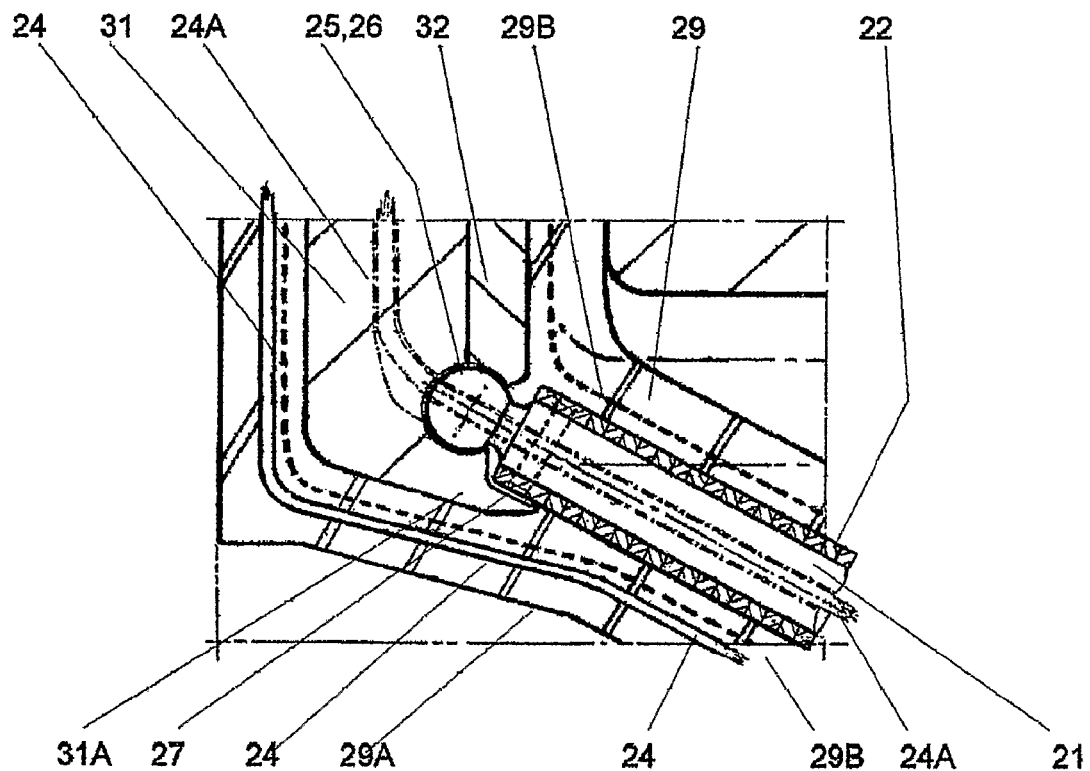
FIG. 10 is an enlargement of part of FIG. 9.
Figure 11:
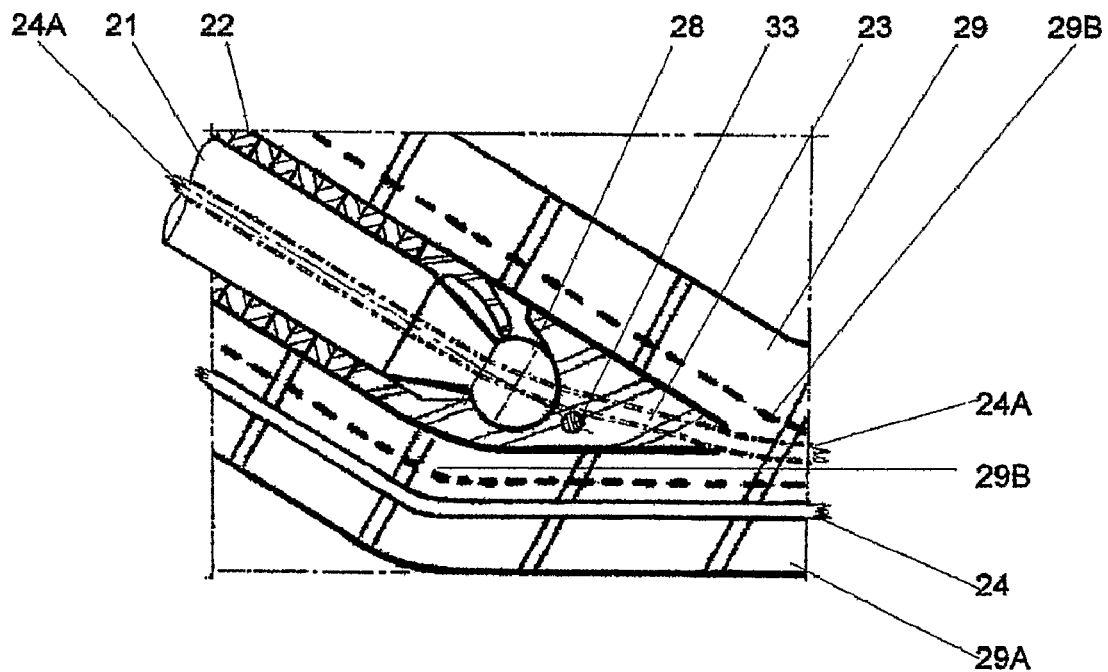
FIG. 11 is an enlargement of another part of FIG. 9.

FIGS. 9 to 11 show a side view in cross section of the inlet section of a duck beak check valve or valve of FIG. 1 where a reinforcing spokes and cage unit is inserted.

Key elements in FIGS. 9 to 11 are the reinforcing spokes 21, which are round section steel bars with ball joint elements at both the inlet and outlet ends. Each spoke rotates about its ball 25 in a socket 26 located in the annular support ring 31, and each spoke rotates towards the flexible tube axis when moving to the valve fully closed position (as shown), and rotates away from the flexible tube axis when opening to the full-open position shown by the ghost outline 11A. The retaining ring 32 holds the balls 25 in their sockets 26. The annular support ring 31 and its sockets 26 restrict the inlet end of the reinforcing spokes and cage unit 20 to a circular shape, but the other end of the cage unit 20 can adopt any shape not restricted by either the ligaments and cables 24, or by the extension 31A of the ring 31, or the walls of the valve body 12.

Inwards rotation of any spoke past the axis when closing is restricted by the system of ligaments or cables 24, and by the extension 31A of the ring 31 on the inside of the spokes 21. The length of each ligament or cable 24 is adjusted and fixed manually and anchored by an external device 34 before it begins operating.

External devices 34 are located adjacent to the inlet and outlet ends of the flexible tube valve, and can be a device of the prior art such as the wedged rotatable posts used to adjust the tension in stringed musical instruments. Each ligament or cable 24 operates within a tubular sheath that protects the rubber parts of the flexible tube 11 from abrasion. The tubular sheath may be a wound tubular helix like those used in vehicle cable brake systems provided it does not itself overly restrict radial movements of the flexible tube.

A collar 27 is pinned around each spoke at its inlet end, and a shoe 23 is attached to the other end of each spoke. Each shoe is attached to the ball end of its spoke by a "spring-closing" device as shown. The collar 27 and shoe 23 on each spoke 21 confine the links 22 to the region between the collar and the shoe 23.

Where FIGS. 9, 10 and 11 provide an example of a duck-beak type of pinch valve the cable 24 and external device 34 are omitted.

FIGS. 10 and 11 show an alternative conduit 24A for the ligaments or cables 24 that passes through the spokes 21. The two ends of each of these alternatively located ligaments or cables 24A connect to similar external devices.

Note that the tubular sheath and conduits for the ligaments and cables must provide adequate room for the ligaments or cables to squirm when the flexible tube is in its open position. Note also that an alternative cylindrical shape, or hinge may be substituted for the ball and socket pivots 25 and 26 shown.

Figure 12:
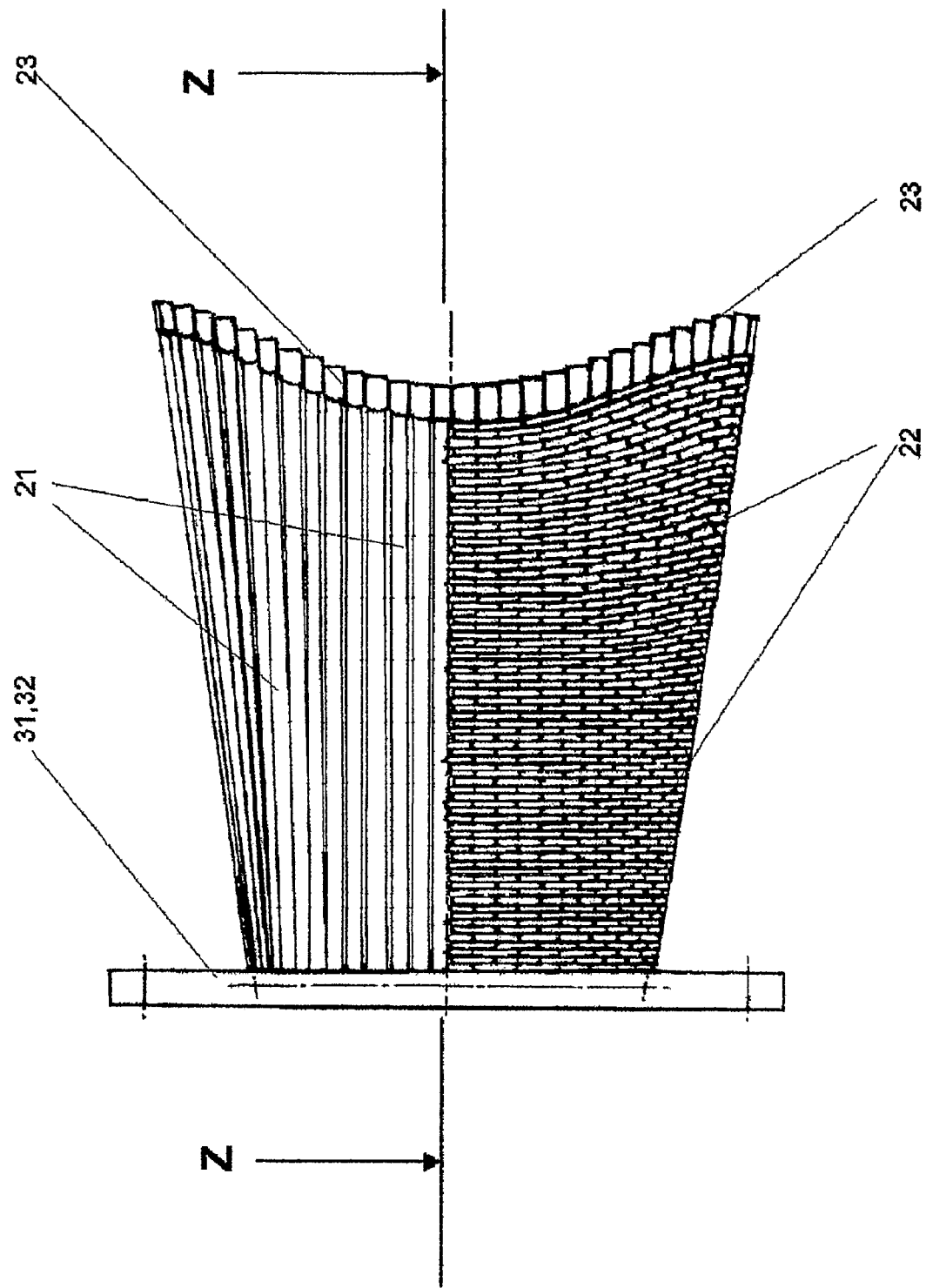
FIG. 12 is a plan view of spokes and links shown in FIG. 9.
Figure 13:
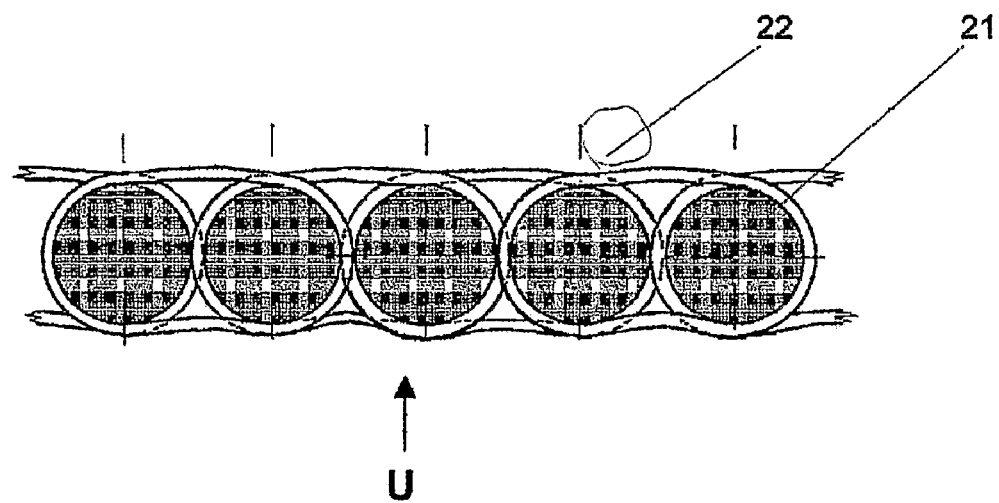
FIG. 13 is an alternative part end in cross section on the arrows Y-Y in FIG. 9 of some of the spokes of some spokes and links.

FIG. 12 shows a plan view of the spokes 21 and its cage in the flexible tube valve closed position. The bottom half of FIG. 13 shows the links 22 that link any two adjacent spokes 21. Each row of links link alternate pairs of spokes 21 to produce the "basket-weave" appearance shown. The top half of the plan view shows the spokes 21 with the links 22 removed, and provides an example of the rods 21 spaced within the fabric of the flexible tube without the addition of the links 22.

FIG. 13 is a part view in cross section on the arrows Y-Y in FIG. 9 showing a system of links 22 attached to link pairs of spokes 21 as shown. Like numerals indicate features in common with all previous figures.

Figure 14:
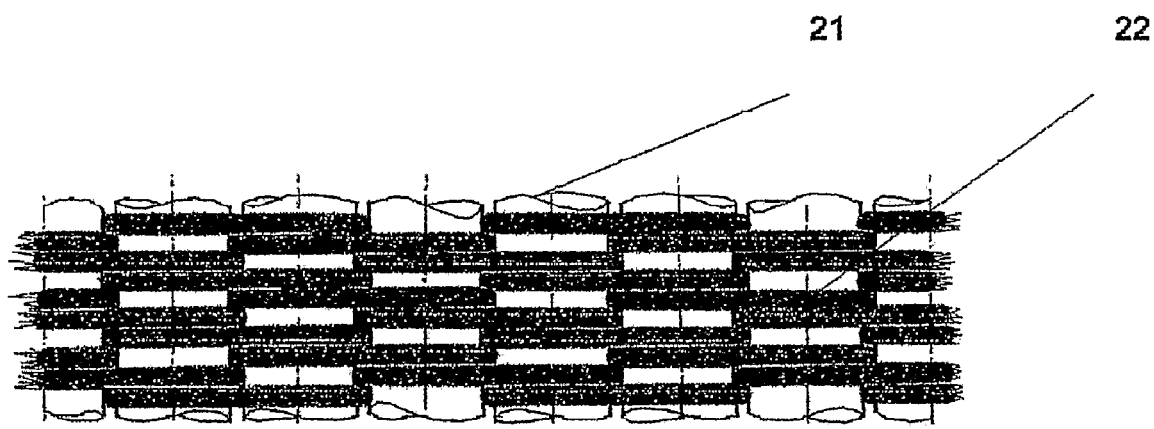
FIG. 14 is a plan view from the direction of arrow U in FIG. 13.

FIG. 14 is a plan view from the direction of the arrow U of FIG. 13 of part of the cage 20 showing how the links 22 of FIG. 13 are alternately positioned around successive pairs of spokes 21.

Figure 15:
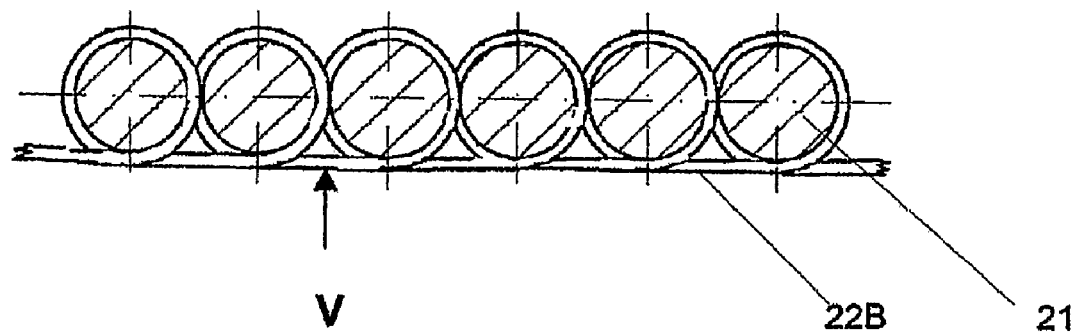
FIG. 15 shows an alternative to FIG. 13.
Figure 16:
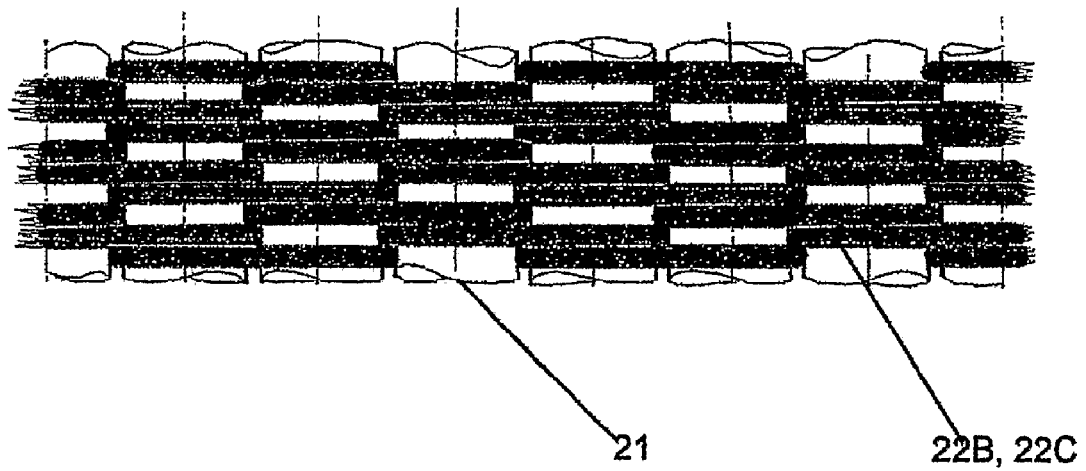
FIG. 16 shows an alternative to FIG. 14.

FIGS. 15 and 16 provide details of alternative links 22B that are woven around spokes 21.

Figure 17:
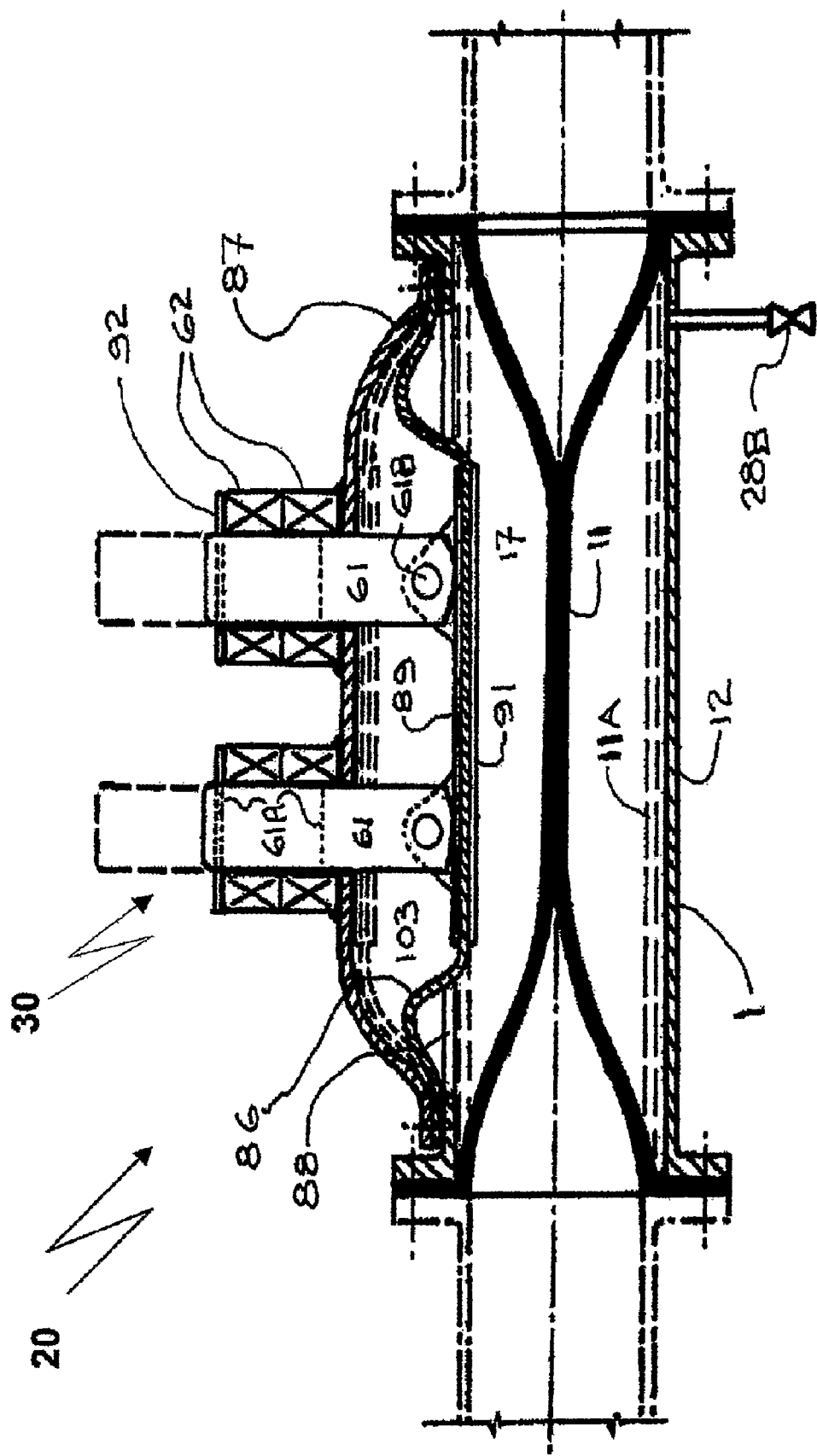
FIG. 17 is a side view part of which is shown in cross section of a valve having electromagnetically driven diaphragm for opening and closing the valve.

FIG. 17 is a side view in cross section of a pinch valve 20. Numbers that are common to FIGS. 1, 2 and 3 indicate components that have basically the same function, and obtain substantially the same description provided above for FIGS. 1, 2 and 3 except the girth of flexible tube 11 is substantially the same along its length. In FIG. 17 a drive unit 30 is directly attached to the valve body 12 of a pinch valve, and enclosed space 17 is filled with gas-free hydraulic liquid.

The electromagnetic drive mechanism 30 moves a diaphragm 86 that is sealingly clamped around its edges, between a flat surfaced flange 88 that extends from the valve body 12 around the periphery of the diaphragm 86, and a stiff cover 87. The diaphragm 86 is also clamped between two stiff plates 89 and 91 over its central regions as shown. The diaphragm 86 and the flange 88, and mating parts can be circular, elliptical, obround, or rectangular when viewed from above in plan.

Electromagnetically actuated solenoids 61, attached by hinges 61B to stiff plate 89 move diaphragm 86 towards the valve axis to close the valve, and away from the valve axis to open the valve. Appropriate energising of the electromagnetic coils 62 moves both solenoids to close or open the valve.

Each solenoid has a vertical slot 61A that allows the solenoid to slide about a guide pin 92 that limits the vertical movement of the solenoid between the valve open and closed positions. Coils 62, and pins 92 are securely attached to the cover 87 and space 103 is air filled and vented.

Figure 18:
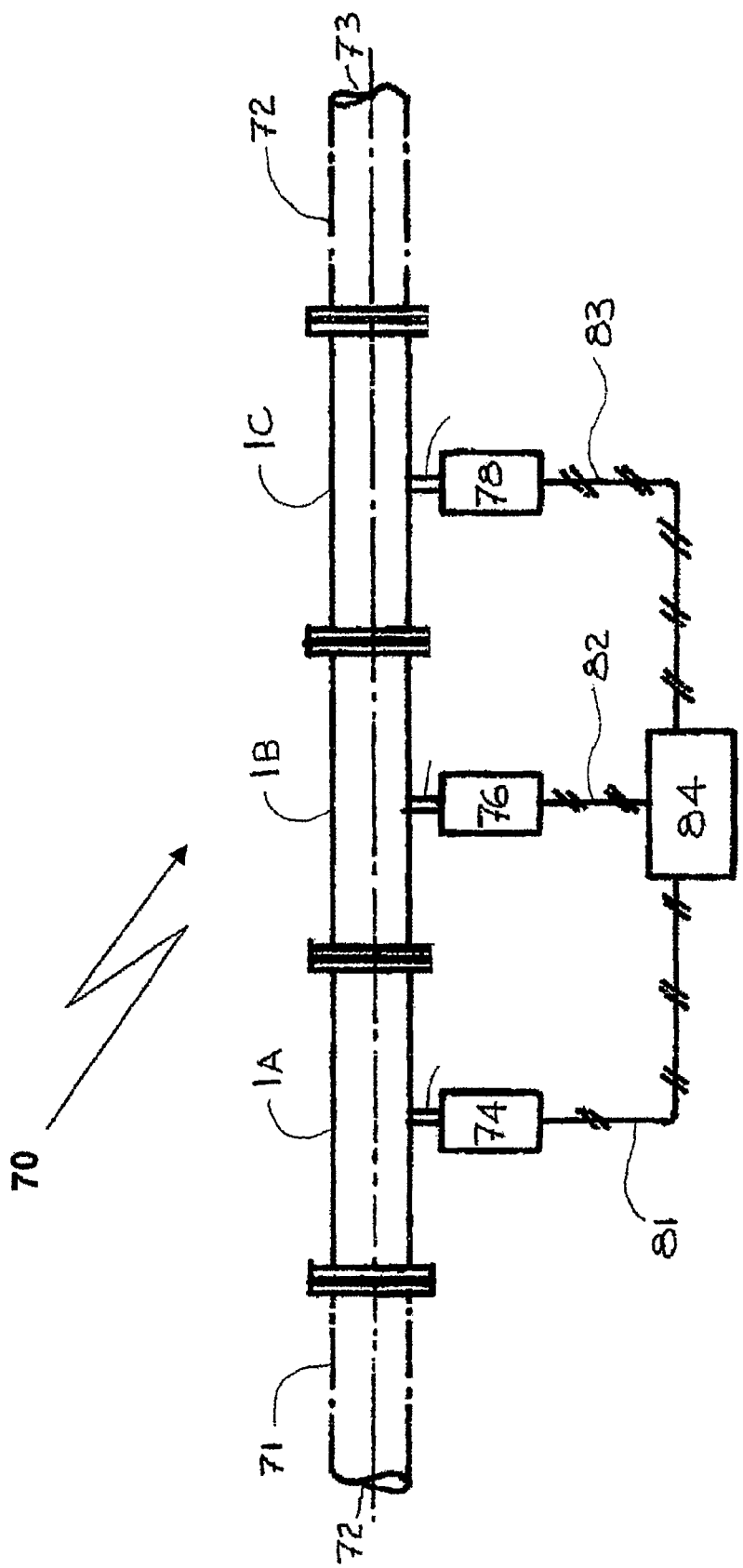
FIG. 18 is a schematic diagram illustrating three valves arranged to function as a pump.

FIG. 18 is a schematic showing a train of three pinch valves 1A, 1B and 1C fastened sealingly to each other at their mating inlet and outlet ends, and to an inlet pipe 71 and an outlet pipe 72 to form a pump 60 having three pinch valves as its pumping elements. Items 74, 76 and 78 are mechanical-, electromagnetic-, hydraulic-, or pneumatic driven mechanisms that change the confines of the enclosed space within the valve body of each pinch valve (exemplified by FIG. 17) to open or close it, or use the delivery or withdrawal of a gas or liquid into each enclosed space of a modified prior art pinch valve, to open or close it.

A feature of pinch valves used in these trains is that the axial length of each flexible tube 11 is at least one third longer than their girth, and each flexible tube is constructed to be most responsive to closing or opening downstream of its inlet end and progressively less responsive towards its outlet end, so that, while the valve is closing, inlet regions of the flexible tube are biased to be pinched closed while its downstream parts are still closing, and while the valve is opening inlet regions of the flexible tube will be biased to open while its downstream parts are still opening. A programmed controller 84 controls when each of the said drive units delivers fluid under pressure to, or withdraws fluid from, each pinch valve to close, or open it as required. Links 81, 82 and 83 communicate commands from the controller 84 to each drive unit 74, 76 and 78, (or where modified prior art pinch valves are used, deliver or release gas or liquid into or from enclosed space 17), in a sequence that opens or closes each of the pinch valves sequentially so that one of the pinch valves is at least part closed while parts of other valves in the train are open or opening. A sequence in which pinch valve 1A, and/or pinch valve 1B and/or pinch valve 1C are closed or closing (while pinch valve 1B, and/or pinch valve IC and/or pinch valve 1A respectively are opening or open) to provide a progressive induction of fluid into inlet 72, and delivery of that fluid through the outlet 73 in a repeating cycle is:

{1A closed, 1B closing, IC open); {1B fully closed, 1C closing, 1A opening}; {1C fully closed, 1A open, 1B opening}; {1A closing, 1B open, 1C opening}, with the cycle repeated, wherein the positions within { } are instantaneous periods in each cycle.

The train shown in FIG. 18 can be extended, mutatis mutandis, to use more than three pinch valves operating in a programmed sequence and any train may have a check valve inserted at its inlet, or its outlet, or at both its inlet and outlets.

Figure 19:
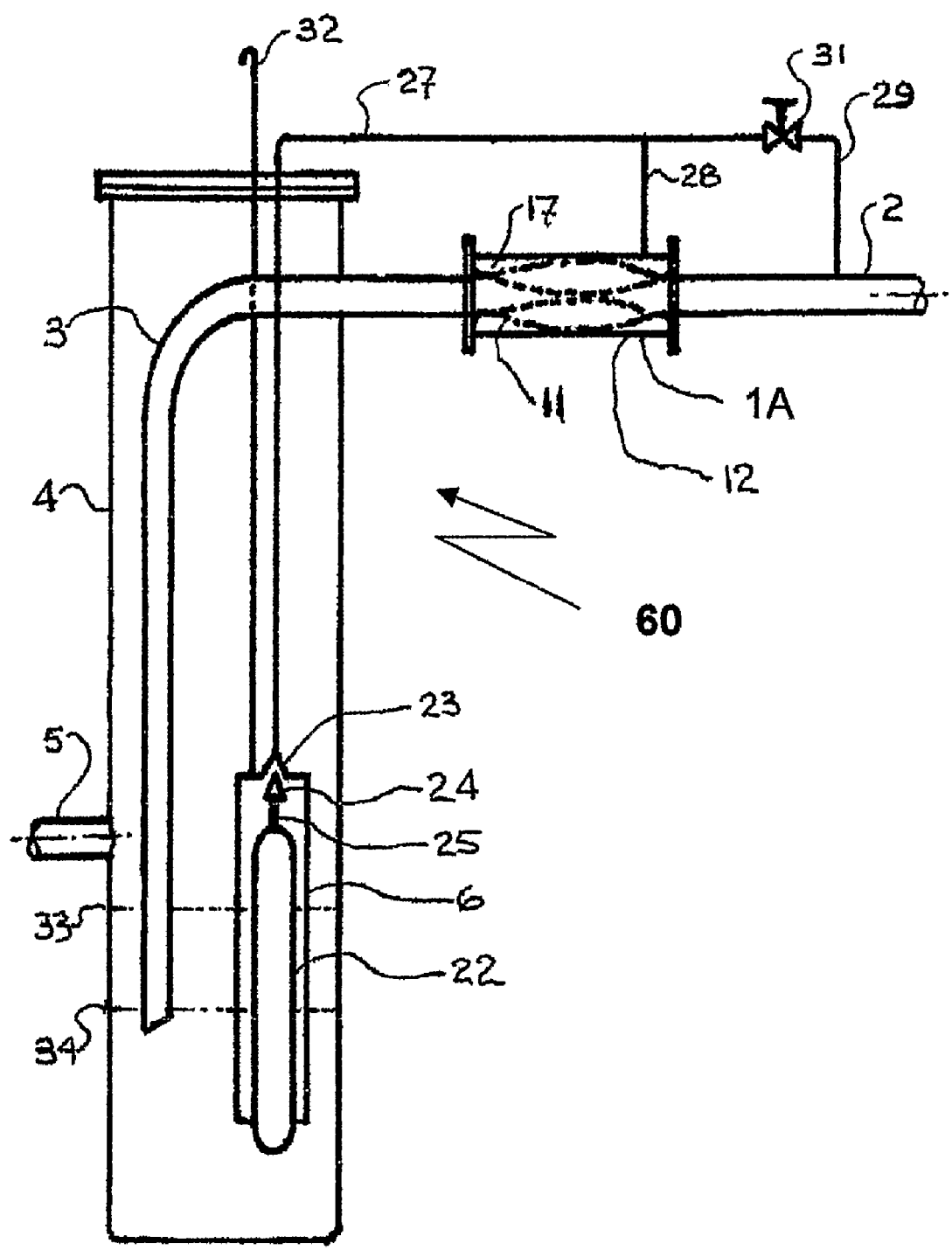
FIG. 19 is a schematic drawing showing a valve installed in a sub-atmospheric pressure driven sewer pipe.

FIG. 19 is a schematic diagram showing an example of an air pressure closing pinch valve applied to a vacuum-driven sewer system 60 where, like numerals indicate features in common with FIGS. 1 and 2.

Waste water or sewage flows by gravity into well 4 through the sewer pipe 5 and accumulates in the base of the well 4. Tubes 27 and 28 connect the enclosed space 17 to the flow restricting valve 31 and the valve seat 23 at the top of float actuated valve unit 6. Valve unit 6 comprises a float 22 that has a valve 24 attached to a stem 25 at its top. Flow-restricting device 31, which can be a valve, or a tube of small bore, is placed between tube 27 and tube 29, which connects to the interior of the sewer pipe 2 at a point downstream of pinch valve 1A. Device 31 restricts the flow of air into conduit 29 induced by sub-atmospheric pressure in the sewer pipe 2.

Pinch valve 1A opens when float 22 rises to level 33, when valve element 24 enters seat 23 and seals conduit 27. Air is withdrawn from conduits 27 and 28, and enclosed space 17 through the flow restriction 31, and pressure in the enclosed space 17 falls to the sub-atmospheric pressure within sewer pipe 2. As result, the outer walls of the flexible sleeve 11 inflate and pinch valve 1A opens: fluid can then flow freely through pinch valve 1A into sewer pipe 2. Periodic withdrawal of accumulated sewage from the well 4 into sewer pipe 2 is accomplished as follows.

Sewage enters through sewer pipe 5 and collects in the base of the well 4 until accumulated sewage level rises from level 34 to level 33.

Float 22 floats up within confining cage 6A with sewage accumulating in the well until valve 24 at the top of float 22 enters seat 23, preventing further atmospheric air entering conduit 27. Pressure in the enclosed space 17 falls towards the sewer pipe pressure and closed pinch valve 1A re-opens.

Sewage is withdrawn from the well into sewer pipes 3 and 2, and the sewage level in well 4 falls towards level 34. As the accumulated sewage level in well 4 falls, float 22 is suspended by both its buoyancy and the sub-atmospheric pressure in conduit 27, which holds valve 24 in its seat 23, until the increasing un-buoyed weight of the float overcomes the valve 24 suspension force and float 22 falls. Valve seat 23 opening is exposed, atmospheric pressure air enters conduits 27, 28 and 29 (but is throttled by flow-restricting device 31) and enclosed space 17, walls of the flexible sleeve 11 are drawn together and pinched closed by the sewer sub-atmospheric pressure, pinch valve 1A closes, and sewage ceases to be drawn from the well into the sewer pipe 3. Further accumulation of sewage in well 4 raises level 34 to 33 and the cycle is repeated.

Figure 20:
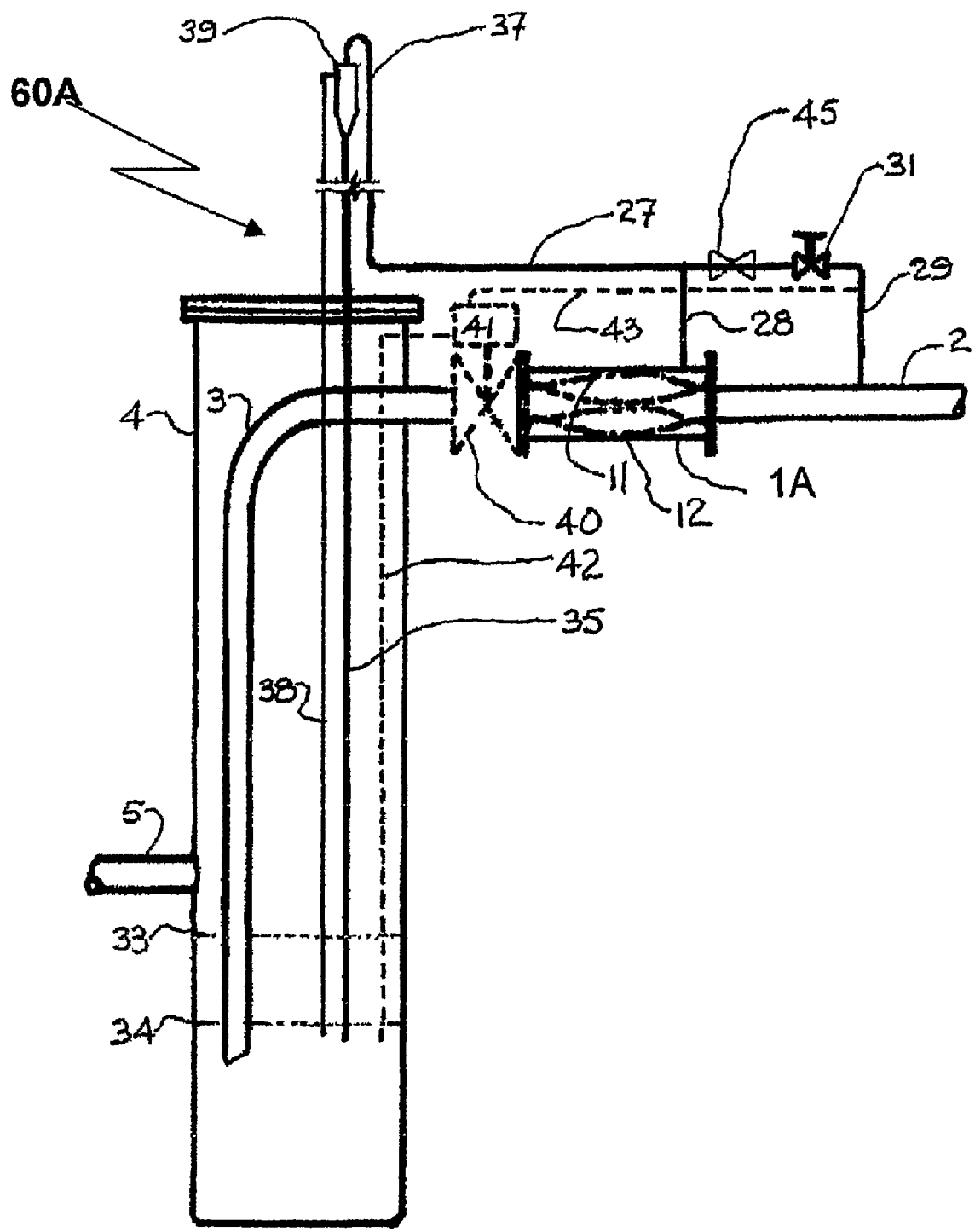
FIG. 20 is a schematic drawing showing an alternative embodiment to that of FIG. 19.

FIG. 20 is a schematic diagram showing an example of the application of an air pressure driven pinch valve to a vacuum-driven sewer system 60A where like numerals indicate features in common with FIG. 19.

In this example the means of controlling the entry or exclusion of atmospheric air from conduit 27 comprises a tall dip-pipe 35, which rises to a height above the expected maximum height (of the liquid column that can be supported by the expected minimum sub-atmospheric pressure in the sewer pipe 2), and remains submerged in the well 4 liquid until that level falls below level 34.

The open bottom of the dip-pipe 35 is set at the minimum acceptable level that accumulated sewage in well 4 can be permitted to reach. Tube 37 connects the space within the dip-pipe 35 to tube 27.

While the open bottom of the dip-pipe 35 remains submerged, liquid is drawn up into the dip-pipe 35 and pressure in the enclosed space 17 reaches and remains that of the sewer pipe 2, and pinch valve 1A remains open.

Whenever the sewage level in well 4 falls below level 34, it exposes the open end of dip-pipe 35, atmospheric air enters dip-pipe 35 and enclosed space 17, and pinch valve 1A closes.

FIG. 20 also shows (in ghost outline, with components indicated by the numbers 40, 41, 42 and 43) a prior art mechanically operated valve typical of those currently used in these sub-atmospheric pressure sewer systems.

Whenever the valve 40 fails to close properly (typically due to obstruction by debris) the sewage liquid level in the well 4 falls below the level 34, and the open bottom of the dip-pipe 35 is exposed. Sewage held in pipe 35 falls out, pressure in dip-pipe 35 rises to atmospheric, which transmits to tubes 37 and 27, and pinch valve 1A closes.

Further influx of sewage into the well 4 (through the sewer pipe 5) increases the sewage level in the well from level 34 to level 33 when valve 40 opens releasing its obstruction, whereafter it continues periodically emptying well 4 until a further failure to close occurs. Manually operated valve 45 can be closed by servicing personnel to hold pinch valve 1A closed during a manual clearing of the valve 40.

In the example shown there is potential for entrained liquid to be drawn into the said enclosed space of the pinch valve 1A while liquid is falling within dip pipe 35. To minimise this, liquid-from-air separating vessel 39, and additional dip pipe 38 can be added as indicated. The bottom of the additional dip pipe 38 is placed slightly above the bottom of its neighbouring pipe 35, and becomes exposed before that of pipe 35.

When this occurs, air rises through dip pipe 38 while liquid falls in dip pipe 35, and the separating vessel 39 (which may be a cyclone) minimises entrainment of liquid into tube 37.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

For example, the flanged ends of the flexible tubes may be omitted and the inlet and outlet ends sealing secured around stiff short length tubes cut to support the duck beak shape or star shape of the flexible tube when closed. These short tubes could support reinforcements embedded in or attached to the wall of the flexible tube.

The materials from which the flexible tube is constructed will preferably be a flexible and fatigue resistant elastomeric material such as a synthetic or natural rubber, and a knitted, or woven and bonded ligaments, or bonding-compatible, tensile strength resistant, abrasion and fatigue resistant fabric may be used where an embedded or attached reinforced fabric is required. Elsewhere metals or stiff fibre-reinforced plastics may be used.

The flexible tube may consist of several concentric flexible tubular layers. It may be wound from flat natural or synthetic rubber sheet or other sheet elastomeric material in several concentric boned layers, to reduce vulnerability to failure by puncture, without sacrificing flexibility, in which the inner layers may be made of a softer material or even coated with PTFE.

The invention claimed is:

1. A valve comprising:
   a flexible tube having first and second end portions defining an inlet and an outlet, respectively;
   a rigid valve body surrounding the flexible tube, the end portions of the flexible tube being sealingly fixed to the valve body to define an enclosed space between the exterior of the flexible tube and the interior of the valve body;
   a fixed volume of a substantially incompressible fluid filling said enclosed space;
   wherein the arrangement is such that, when the pressure at the outlet is greater than the pressure at the inlet, the flexible tube adjacent the outlet moves outwards displacing some of the fluid from the outlet region towards the inlet region so that the flexible tube is compressed in the region adjacent the inlet and the flexible tube is substantially collapsed so as to close the valve or allow severely restricted flow;
   wherein, when the pressure at the inlet is greater than that at the outlet, some of the fluid is displaced from the inlet area towards the outlet area so that the flexible tube is expanded in the area adjacent the inlet.

2. A valve as claimed in claim 1 wherein the girth of the second end portion of the flexible tube is greater than the girth of the first end portion of the flexible tube.

3. A valve as claimed in claim 1 wherein the first portion of the flexible tube is closed in its relaxed state.

4. A valve as claimed in claim 3 wherein biasing means are provided to bias the first portion of the flexible tube to a closed position; wherein the biasing means comprise clamping means clamping each lateral side of the flexible tube together, but allowing expansion of the central part of the flexible tube.

5. A valve as claimed in claim 3 wherein biasing means are provided to bias the first portion of the flexible tube to a closed position; wherein the biasing means comprises stitching retaining each lateral side of the flexible tube together but allowing expansion of the central part of the flexible tube.

6. A valve as claimed in claim 3 further comprising a spigot and at least one reinforcement member, the spigot comprising a spigot inlet portion and a spigot outlet portion, the inlet of the flexible tube comprising an attachment portion adapted for sealing attachment to the spigot, and the at least one reinforcement member being adapted to pivot on the spigot outlet portion to reinforce the flexible tube against an externally applied pressure when the valve is closed, and move with the flexible tube when the valve opens.

7. A valve according to claim 6 wherein the reinforcement member is an inner stiff member or an inner stiff plate attached to an inner surface of the flexible tube, and the spigot outlet portion is extended as one or more inclined surfaces that reinforce the flexible tube against an externally applied pressure when the valve is closed.

8. A valve according to claim 6:
   wherein the reinforcement member comprises an outer stiff member securely linked to an inner stiff member to form a composite reinforcement member;
   wherein the outer stiff member is attached to an outer surface of the flexible tube;
   wherein the inner stiff member is attached to an inner surface of the flexible tube;
   wherein the spigot outlet portion is extended as one or more inclined surfaces that reinforce the flexible tube against an externally applied pressure when the valve is closed.

9. A valve according to claim 3 wherein the second portion of the flexible tube is biased by its construction towards being open in its relaxed state.

10. A valve as claimed in claim 1 wherein the length of the second portion of the flexible tube is longer than its first portion.

11. A valve as claimed in claim 1 wherein the flexible tube comprises two or more part tubes fixed together by clamping, or other suitable means to define a tube.

12. A valve according to claim 1 wherein outward excursions of the flexible tube towards a localized flattening in regions adjacent the outlet are restricted by means outside of the second portion of the flexible tube limiting such excursions, thereby preventing closure of the second portion.

13. A valve as claimed in claim 1 wherein a plurality of flexible cables or ligaments adjustable in length are located in flexible conduits embedded within the flexible tube and are used to control the shape of the flexible tube when it is closing.

14. A valve as claimed in claim 1 wherein the walls of the flexible tube in the first portion are more flexible than the walls of the flexible tube in the second portion.

15. A valve comprising:
   a flexible tube having first and second end portions defining an inlet and an outlet, respectively;
   a rigid valve body surrounding the flexible tube, the end portions of the flexible tube being sealingly fixed to the valve body to define an enclosed space between the exterior of the flexible tube and the interior of the valve body;
   a fixed volume of a substantially incompressible fluid located in the said enclosed space;
   wherein the arrangement is such that when the pressure at the outlet is greater than the pressure at the inlet, the flexible tube adjacent the outlet moves outwards displacing some of the fluid from the outlet region towards the inlet region so that the flexible tube is compressed in the region adjacent the inlet and the flexible tube is substantially collapsed so as to close the valve or allow severely restricted flow;
   wherein when the pressure at the inlet is greater than that at the outlet, some of the fluid is displaced from the inlet area towards the outlet area so that the flexible tube is expanded in the area adjacent the inlet;
   wherein reinforcing spokes are defined in the flexible tube adjacent the inlet;
   wherein each spoke comprises a round section stiff bar with a first ball joint element disposed toward the inlet;
   wherein one or more retaining rings disposed toward the inlet holds the first ball joint elements in sockets so as to dispose the first ball joint elements in a circular configuration.

16. A valve according to claim 15:
   wherein each spoke further comprises a second ball joint element disposed toward the outlet;
   wherein each second ball joint element pivotally engages a shoe adapted to move engagingly with the flexible tube as the valve closes and opens;
   wherein the shoe provides an enlarged area over which forces from an externally applied pressure are distributed when the valve is closed.

17. A valve as claimed in claim 15:
   wherein the reinforcing spokes comprise a plurality of pairs of the reinforcing spokes:
   wherein each adjacent pair of reinforcing spokes are spaced apart by a plurality of links; wherein each link encircles both of an adjacent pair of the reinforcing spokes to allow rotation of each reinforcing spoke within each link while holding the reinforcing spokes in a spaced array;

whereby the spaced array provides a flexible tubular assembly of spaced reinforcing spokes.

18. A valve as claimed in claim 15:

wherein the reinforcing spokes comprise a plurality of pairs of the reinforcing spokes:

wherein each adjacent pair of the reinforcing spokes are spaced apart by one or more ligaments that are woven to encircle each spoke and hold adjacent reinforcing spokes in a flexible tubular assembly of spaced reinforcing spokes.

* * * * *